Nov. 11, 1969     J. R. BACON     3,478,357

SWEEP GENERATOR FOR PPI RADAR DISPLAY

Original Filed Oct. 20, 1966     2 Sheets-Sheet 1

INVENTOR.
JAMES R. BACON
BY
Thomas P. Murphy
ATTORNEY

Nov. 11, 1969        J. R. BACON        3,478,357

SWEEP GENERATOR FOR PPI RADAR DISPLAY

Original Filed Oct. 20, 1966        2 Sheets-Sheet 2

INVENTOR.
JAMES R. BACON
BY
ATTORNEY

United States Patent Office 3,478,357
Patented Nov. 11, 1969

3,478,357
SWEEP GENERATOR FOR PPI RADAR DISPLAY
James R. Bacon, Philadelphia, Pa., assignor to Burroughs Corporation, Detroit, Mich., a corporation of Michigan
Continuation of application Ser. No. 588,067, Oct. 20, 1966. This application May 7, 1968, Ser. No. 727,383
Int. Cl. G01s 9/04
U.S. Cl. 343—10
9 Claims

ABSTRACT OF THE DISCLOSURE

The primary of a synchro resolver is rotated at the rotational frequency of a radar antenna and excited by a higher frequency square wave voltage. The positive and negative portions of the modulated square wave output voltages from the secondaries are alternately eliminated and the square wave components are filtered out. The resultant sine waves are then integrated a plurality of times during each cycle and the ramp voltage outputs of the integrator are used to drive the deflection circuits of a CRT.

---

This is a continuation of application Ser. No. 588,067, filed Oct 20, 1966, now abandoned.

This invention relates to sweep generators and more particularly, to a sweep generator for use in a radar system of the plan position indicator (PPI) type In PPI radar systems the face of a cathode ray tube displays a polar map of all echo producing objects within a predetermined radius of the radar station. Such a polar map provides range information in the form of distance and angular orientation of individual objects relative to the radar station.

In a typical PPI radar system an antenna continuously rotates through a 360° angle. At various angular positions during its rotation the antenna is caused to transmit and receive radar pulses. The number of transmissions of radar pulses and receptions of pulse echoes is large relative to the rotation rate of the antenna. For each radar pulse transmitted and received at a particular angular position of the antenna a radial sweep is provided at an associated angular position on the face of the cathode ray tube. The angular position of each successive sweep changes in a clockwise direction and the sweeps appear to be one line rotating about an origin at the center of the cathode ray tube. This line makes one full rotation on the face of the tube for each full rotation of the antenna, and its position at any instant represents the direction that the antenna is facing at that time.

Naturally, accurate synchronization of the rotation rate of the rotating trace line with that of the antenna must be obtained. The present invention provides this required synchronization. In carrying out this purpose the present invention effectively converts angular rotation of a radar antenna to a PPI display for presentation on the face of a cathode ray tube.

Various systems are presently used for accomplishing the above purpose.

One system consists in electronically providing radial sweeps on the face of a cathode ray tube which uses a magnetic yoke for beam deflection. In this method the yoke is mechanically rotated about the neck of the cathode ray tube by a servomechanism driven by input signals from the radar antenna. Thus, the constantly recurring radial sweeps are made to rotate on the face of the tube in synchronism with the antenna. The disadvantages of utilizing as a moving part so critical an element as the deflection yoke are obvious (additional intercoupling structure, frictional wear, increased maintenance, etc.). Furthermore, such a system is inconsistent with display of symbols (such as alphanumeric symbols) which must be stationary relative to the rotating sweeps.

Another system employs the well known idea of applying sinusoidally and cosinusoidally varying voltage ramps to the horizontal and vertical deflection elements of a cathode ray tube. In this system the radial sweep is caused by a voltage ramp which is effectively the resultant of two voltage ramps, one of which is made to vary as a sine and the other as a cosine at a rate determined by antenna rotation rate.

One way of implementing this system comprises the use of a synchro resolver whose primary winding is rotated by a shaft which is rotated at the speed and in synchronism with the antenna. A ramp voltage $Et$ ($t$ is time measured for the time of zero range) is applied to the primary winding of the resolver. The outputs of the two secondaries of the resolver are then $(E \cos \theta)t$ and $(E \sin \theta)t$ where $\theta$ is the angle the antenna makes with some reference, e.g., north.

However, due to AC coupling of the resolver, the ramp voltage which has a zero DC reference when applied to the primary of the resolver has a floating DC reference in the secondaries This loss of reference causes the radial sweeps on the cathode ray tube to originate at a point other than the center of the screen. Thus, a DC restorer circuit must be used to restore the zero DC reference of the ramp voltages on the secondaries of the resolver.

Furthermore, an ordinary synchro resolver has a very narrow pass band. A ramp voltage which is essentially a sawtooth contains many harmonics of the fundamental frequency which the resolver cannot pass. In such a case, the ramp voltage will be so badly deformed as to be useless for proper deflection of the electron beam in the cathode ray tube. Therefore, highly sophisticated electronic circuitry must be used to improve the linearity of the ramp voltage either by modifying the ramp voltage at the input or by use of complex feedback techniques after transformation. Even the best and most expensive synchro resolvers available have such poor frequency response as to still require most or all of the foregoing corrective circuitry.

The present invention also employs the well known idea of applying sinusoidal and cosinusoidally varying voltage ramps to the deflection elements of a cathode ray tube. However, the present invention employs an ordinary low cost synchro resolver of low frequency response without the need for any sophisticated electronic circuitry to correct linearity of the output voltage ramps. At the same time, the present invention eliminates the need for a DC restorer circuit. Therefore, the present invention overcomes all of the disadvantages pointed out in the above-mentioned systems.

In carrying out the foregoing functions, the present invention employs a synchro resolver of conventional type comprising a rotatable primary winding and two stationary secondary windings. In the present instance, the primary winding is rotated at the same rate as the scanning antenna, e.g., it can be driven by connecting it to the shaft which rotates the scanning antenna. A reference voltage such as a square wave, is used to excite the primary winding, providing at the outputs of the two secondaries the sine and cosine function of the angle which the scanning antenna makes with some reference, e.g., north. The output of each secondary winding is then synchronously demodulated and fed through a filter which eliminates the carrier or reference voltage. The output of each filter network is then integrated once for each radial radar sweep of the cathode ray tube. The periods of integration themselves are controllable and are made over such short periods of time that the voltage integrated is effectively a constant. There are thus provided voltage ramps whose maximum amplitudes vary respectively in accordance with the sine and cosine functions of the angle that the scanning antenna makes with the reference. These sinusoidally varying voltage ramps provide the X and Y components of the radial radar sweeps which cause the sweeps to rotate about the center of the screen of the cathode ray tube at the same speed and in synchronism with the scanning antenna.

Therefore, it is an object of the present invention to convert scanning antenna rotation to a PPI radar display.

Another object of the present invention is to provide a sweep generator circuit for use in a PPI radar system wherein the radial radar sweeps are caused to rotate about the center of the cathode ray tube screen in synchronism with scanning antenna rotation.

A further object of the present invention is to provide a sweep generator for use in a radar system of the PPI type wherein an ordinary synchro resolver is utilized without necessity for resorting to DC restoration circuitry or linearity correction circuitry.

Yet another object of the present invention is to generate sinusoidally varying voltage ramps as the X and Y components of a radial sweep voltage utilizing an ordinary synchro resolver wherein the deflection voltage ramp is not directly applied to the primary of the synchro resolver.

Other objects and many of the attendant advantages of the present invention will become more apparent on reading the following description in conjunction with the drawing wherein:

FIGURE 1 illustrates in block diagram form a preferred embodiment of the present invention;

FIGURE 2 schematically represents a synchro resolver suitable for use in the present invention;

Figure 1:
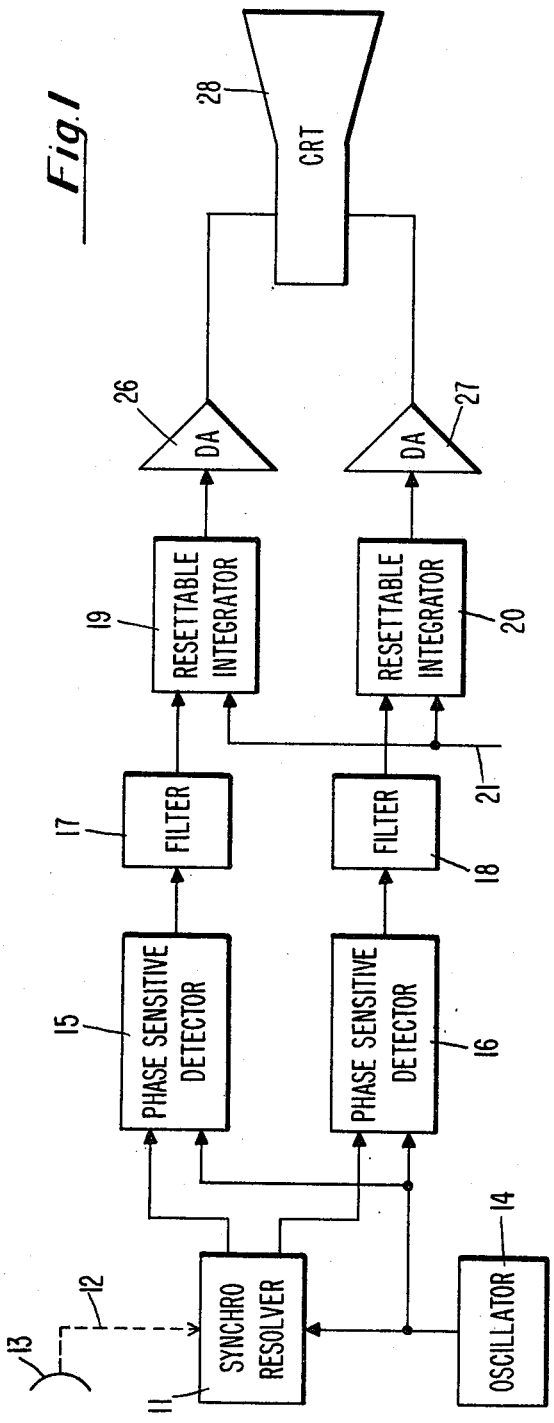
Figure 2:
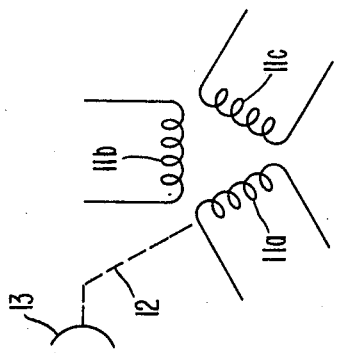

Referring now more particularly to the drawings, there is shown in FIGURE 1 a synchro resolver 11. The synchro resolver 11 comprises, as best seen in FIGURE 2, a rotatable primary winding 11a inductively coupled to a pair of orthogonally disposed secondary windings 11b and 11c. As shown in FIGURES 1 and 2, the primary winding 11a of the synchro resolver 11 receives a mechanical input and an electrical input. The mechanical input consists of rotating the primary winding 11a relative to the secondary windings 11b and 11c by means of the shaft which rotates the scanning antenna through 360°. The synchro resolver 11, for example, may be mounted on the shaft 12 of scanning antenna 13 or driven in any other convenient manner.

The other input to the synchro resolver 11 is electrical and is provided by a square wave oscillator 14. The square wave oscillator 14 provides the excitation voltage to the primary winding 11a of the synchro 11. The frequency of the square wave is well within the band pass of the resolver and may be, for example, 2500 c.p.s. The use of a square wave is not critical and a sinusoidal wave could also be used to excite the primary winding 11a.

Since the primary winding 11a rotates at the same speed as the scanning antenna 13, the output signals on the secondary windings 11b and 11c are a function of the changing angle which the scanning antenna makes with a reference, e.g., north.

To be more precise, considering the fundamental frequency of the square wave applied to the primary winding 11a as $E \sin ut$, the outputs on the secondary windings 11b and 11c are $EK \cos \theta \sin ut$ and $EK \sin \theta \sin ut$, where K is the maximum coupling coefficient between the primary and secondary of the resolver, $\theta$ is the angle that the resolver and therefore, the scanning antenna makes with the reference. As will become clearer later, the output on the secondary windings 11b and 11c is the square wave modulated by the sine and cosine functions of the angle.

Figure 4:
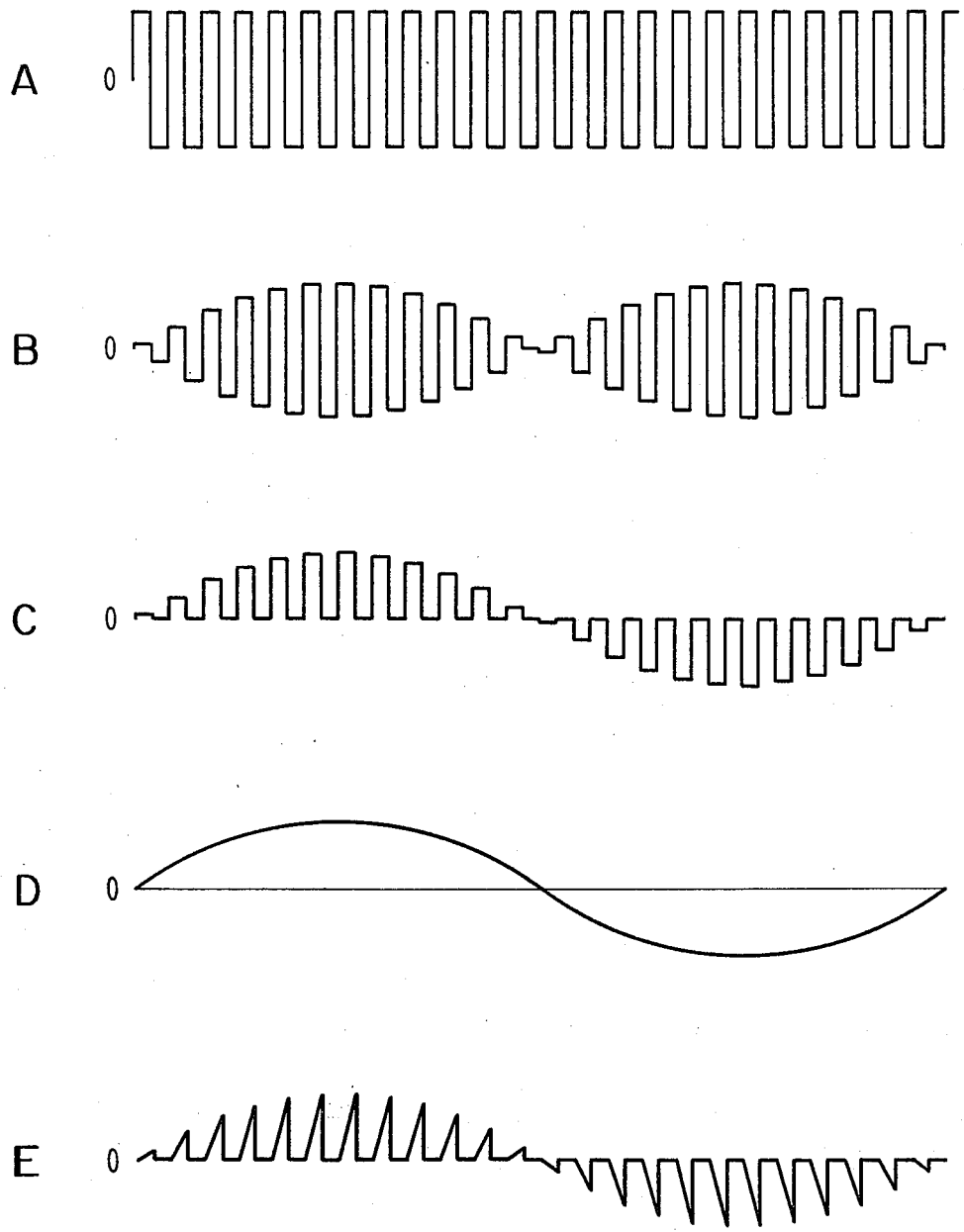
FIGURE 4 illustrates in graphical form voltage waveforms representative of the voltages at various points in the present invention and useful in understanding the present invention.

Referring to FIGURE 4, the square wave represented on line A is the excitation voltage applied to the primary winding 11a of the synchro resolver 11. The wave form represented on line B is the output waveform provided on the secondary winding 11b of the synchro resolver 11. This output voltage is the square wave voltage modulated according to the sine function of the angle $\theta$ which the rotating primary winding 11a makes with the reference. Since the primary winding 11a is caused to rotate with the scanning antenna, $\theta$ is also the angle that the scanning antenna makes with the reference. Although not shown in FIGURE 4, the output of the secondary winding 11c of the synchro resolver 11 is the cosine function of the angle $\theta$ which, of course, is 90° out of phase with the sine function.

The secondary winding 11b is connected to a phase sensitive detector or synchronous rectifier 15 while the output secondary winding 11c is connected to phase sensitive detector 16. The phase sensitive detectors each also receive inputs from the oscillator 14 and are driven with the same input wave which is used to excite the primary winding 11a of the synchro resolver 11. The phase sensitive detectors 15 and 16 are conventional and each one may comprise a single transistor switch.

A typical phase sensitive detector may comprise a single transistor. In the present instance phase sensitive detector 15 would comprise a transistor having its base connected via a resistor to the output terminal of the oscillator 14 and its emitter connected to the secondary winding 11b of the synchro resolver 11. The collector would be connected to ground. When the square wave voltage and the voltage from secondary winding 11b are in phase, the transistor is non-conductive only when the voltage in secondary winding 11b is positive. When, however, the square wave voltage and the voltage from secondary winding 11b are out of phase the transistor is non-conductive only when the voltage in secondary winding 11b is negative. Thus, the phase sensitive detector takes advantage of the capability of a transistor to reverse current flow direction depending on the particular biasing of the transistor.

Each of the phase sensitive detectors 15 and 16, therefore, alternately eliminate the negative and positive portions of the modulated signals received from the respective secondary windings of the synchro resolver 11. The waveform passed by the phase synchronous detector 15 is represented by the waveform shown on line C of FIGURE 4. Except for its 90° displacement in phase the output of the phase sensitive detector 16 is identical to the output from the phase sensitive detector 15 and, therefore, is not shown.

The outputs of phase sensitive detectors 15 and 16 are connected to low pass filters 17 and 18.

The filters 17 and 18 filter out the high frequencies or the remaining portion of the square wave in the output signals from the phase sensitive detectors 15 and 16, respectively. The output from the filters 17 and 18 are therefore $E \sin \theta$ and $E \cos \theta$, respectively. Thus, the sine and cosine function of the angle $\theta$ which the primary winding 11a and therefore the scanning antenna 13 make with a reference have now been extracted. Waveform D of FIGURE 4 is representative of the signal out of the filter 17. It should be understood, although not shown, that the waveforms out of the filters 17 and 18 are identical except for the 90° phase displacement.

It is from these signals that sinusoidally and cosinusoidally varying voltage ramps are generated.

The signals represented by the waveform D and its cosine counterpart are applied as inputs to the resettable integrators 19 and 20.

The resettable integrators 19 and 20 are conventional. Each is basically an operational amplifier connected as a Miller integrator. A Miller integrator is an operational amplifier having an input resistor and a feedback capacitor. The resettable feature consists in controlling the period of integration. The resettable integrators 19 and 20 each have a second common input conductor 21. Pulses applied to the resettable integrators 19 and 20 via the conductor 21 control initiation, duration and cessation of each period of integration. The period of integration is chosen to be so short relative to the rate of change of the input sine and cosine voltages that the input voltage is effectively a constant during the period of integration. Therefore, the output of the integrators are ramps $R(\sin \phi)t$ and $R(\cos \phi)t$ where R is a constant and $t$ is measured from the start of integration. In the present system start of the period of integration is simultaneously begun at zero range for each radial radar sweep.

Figure 3:
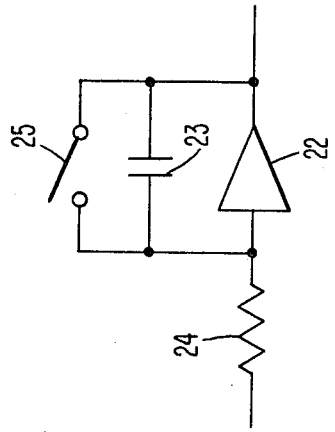
FIGURE 3 illustrates in schematic form a resettable integrator which can be utilized in the present invention.

FIGURE 3 illustrates in schematic form an operational amplifier connected as a Miller integrator of the type used in each of the resettable integrators 19 and 20. The Miller integrator comprises an amplifier 22 having a capacitor 23 connected between the input and output thereof. The amplifier 22 is further provided with an input resistor 24. The normally open switch 25 is connected across capacitor 23.

In operation, the Miller integrator of FIGURE 3 provides in response to a sinusoidally varying voltage input, a series of voltage ramps which also vary sinusoidally in amplitude in accordance with the input voltage. When switch 25 is closed the Miller integrator has no voltage output. When, however, switch 25 is open, resistor 24 and capacitor 23 integrate the voltage applied to the input for the time interval that the switch 25 is closed. As aforesaid, the period that the switch 25 is closed and therefore the period during which the circuit of FIGURE 3 integrates is chosen to be so small relative to the period of the waveform shown in line D of FIGURE 4 the voltage that the Miller integrator FIGURE 3 sees is effectively a constant DC. Therefore, the output of the integrator of FIGURE 3 during the time the swich 25 is open is a ramp of linear rise time which abruptly falls to ground voltage when the switch 25 is opened. The switch 25 is opened a relatively large number of times (equal to the number of radar radial sweeps) during each cycle of the voltage applied to the resettable integrator from its respective filter. Therefore, the output of resettable integrator 19, for example, is a series of voltage ramps which vary sinusoidally as shown in line E of FIGURE 4. The voltage ramps from both of the resettable integrators are in the form suited to be applied to the X and Y deflection elements of a cathode ray tube to provide thereto the requisite components of each radial sweep in a PPI radar system. If the voltage from filter 17 is given by the waveform in line D of FIGURE 4, the output of the resettable integrator 19 is represented by the waveforms on line E of FIGURE 4. Resettable integrator 20, will, of course, have a similar output to that shown in line E. However, its voltage ramps will vary according to the cosine function of the angle $\theta$.

While shown as a simple switch 25, the means for controlling the integration period in each of the resettable integrators 19 and 20 may be a transistor switching arrangement controllable by pulses appearing on the conductor 21. Each resettable integrator 19 and 20 integrates over the same period and the number of control pulses applied via the conductor 21 is equal to the number of radial sweeps occurring during one complete rotation of the scanning antenna 13 and of the primary winding 11a. The output of the resettable integrator 19 then is $(E \sin \theta)t$ and the output from the resettable integrator 20 is $(E \cos \theta)t$. These outputs are connected to the vertical and horizontal inputs of deflection amplifier means here shown as two deflection amplifiers 26 and 27. The output of the deflection amplifier 26 is applied to the horizontal deflection elements of the cathode ray tube 28. The output of the deflection amplifier 27 is connected to the vertical deflection elements of the cathode ray tube 28. The deflection elements may be either magnetic or electrostatic.

Since the outputs of the resettable integrators 19 and 20 are $(E \sin \theta)t$ and $(E \cos \theta)t$, resultant vector voltage applied to the deflection elements of the cathode ray tube 28 is equal to square root of $E^2 t^2 (\cos 2\theta + \sin 2\theta)$. Since $\cos 2\theta + \sin 2\theta$ equal 1, the amplitude of the ramp at any time is equal to $Et$ which is sufficient to cause the cathode ray tube beam to sweep from the center of the tube to its outer periphery. The angle which each radial sweep line makes wih a reference corresponds to the angle $\theta$ made by the antenna at that particular time.

Since different ranges require larger or smaller voltage ramps to cause the beam to trace to the outer periphery of the cathode ray tube face, the capacitor 23 in each resettable integrator may have to be changed. In practice, this is accomplished by providing a bank of capacitors which may be selectively connected across the respective amplifiers 22 of each resettable integrator 19 and 20.

Thus, there has been provided a system for converting the angular rotation of an antenna of a scanning radar antenna to a PPI display for presentation on the screen of a cathode ray tube.

Other variations of the present invention are possible in the light of the above description and nothing in the description should be construed as limiting the invention beyond the limitations expressly set forth in the claims.

What is claimed is:

1. In a PPI radar system having a revolving antenna,
   first means including a source of alternating current for generating a first substantially zero DC reference level periodic sine wave voltage whose positive and negative alternations are of equal amplitude and whose period is equal in time to a revolution of said antenna and which varies in accordance with the sine of the angle the antenna makes with a reference and for generating a second substantially zero DC reference level periodic sine wave voltage whose positive and negative alternations are of equal amplitude and whose period is equal in time to a revolution of said antenna and which varies an accordance with the cosine of said angle,
   second means connected to said first means for integrating said first and second voltages a plurality of times during each period of said first and second voltages to provide as an output a first series of voltage ramps whose amplitude varies in accordance with said first voltage and a second series of voltage ramps whose amplitude varies in accordance with said second voltage.

2. In a PPI radar system according to claim 1 wherein said first means includes,
   a synchro resolver having a primary winding rotatable relative to first and second secondary windings,
   means rotating said primary winding at the same rate the antenna revolves,
   oscillator means connected to said primary winding providing an AC excitation voltage to said primary winding.

3. In a PPI radar system having a revolving antenna,
   first means for generating a first substantially zero DC reference level sine wave voltage varying in accordance with the sine of the angle the antenna makes with a reference and a second substantially zero DC reference level sine wave voltage varying in accordance with the cosine of said angle, and
   second means connected to said first means for integrating said first and second voltages a plurality of times during each period of said first and second voltages to provide as an output a first series of voltage ramps whose amplitude varies in accordance with said first voltage and a second series of voltage ramps whose amplitude varies in accordance with said second voltage, and wherein said first means includes, a synchro resolver having a primary winding rotatable relative to first and second secondary windings, means rotating said primary winding at the same rate the antenna revolves, oscillator means connected to said primary winding providing an AC excitation voltage to said primary winding, first synchronous detector means connected to said first secondary winding eliminating alternately the positive and negative portions of the signal from said first secondary winding, second synchronous detector means connected to said second secondary winding eliminating alternately the positive and negative portions of the signal from said second secondary winding, first filter means connected to said first synchronous detector means eliminating said AC voltage from the signal from said first synchronous detector means, and second filter means connected to said second synchronous detector means eliminating said AC voltage from the signal from said second synchronous detector means.

4. In a PPI radar system according to claim 3 wherein said second means comprises, a first integrator, a second integrator, control means connected to said first and second integrators for simultaneously initiating and controlling the duration of the period of integration for each of said plurality of times.

5. In a PPI radar system according to claim 4 wherein each of said first and second integrators comprises, an operational amplifier, a capacitor connected between the input and output termnials of said operational amplifier, a resistor connected to the common junction of said capacitor and the input terminals of said operational amplifier, normally closed switch means connected in parallel to said capacitor and operably connected to said control means whereby integration of a signal applied to the input terminal of the operational amplifier continues only while said switch means is held open by said control means.

6. In a PPI radar system according to claim 3 wherein said second means includes, a first integrator connected to said first filter means, a second integrator connected to said second filter means, control means connected to said first and second integrators for simultaneously initiating and controlling the duration of the period of integration for each of said plurality of times.

7. In a PPI radar system according to claim 6 wherein each of said first and second integrators comprises, an operational amplifier, a capacitor connected between the input and output terminals of said operational amplifier, a resistor connected to the common junction of said capacitor and the input terminal of said operational amplifier, normally closed switch means connected in parallel to said capacitor and operably connected to said control means whereby integration of a signal applied to the input terminal of the operational amplifier continues only while said switch means is held open by said control means.

8. A circuit for providing a plan position indicator display on the screen of a cathode ray tube wherein radial radar sweeps rotate about the center of the screen at the angular rate of the scanning antenna, comprising in combinaton, Generator means providing an AC output voltage, first means connected to said generator means modulating said AC output voltage as the sine and cosine functions of the angle the scanning antenna makes with a reference direction, second means connected to said first means providing alternately the positive and negative portions of a voltage varying as the envelope of said sine modulated voltage, third means connected to said first means providing alternately the positive and negative portions of a voltage varying as the envelope of said cosine modulated voltage, integrating means connected to said second and third means integrating over controlled time periods each of said voltages from said first and second means a plurality of times during each revolution of the antenna.

9. In a PPI radar system having a scanning antenna, first means providing an AC carrier signal modulated in accordance with the sine function of the angle the scanning antenna makes with a reference, second means providing an AC carrier signal modulated in accordance with the cosine function of the angle the scanning antenna makes with the reference, third means connected to said first means providing alternately the positive and negative portions of a voltage varying as the envelope of said sine modulated voltage.

fourth means connected to said second means providing alternately the positive and negative portions of a voltage varying as the envelope of said cosine modulated voltage, fifth means connected to said second means integrating said voltage therefrom a plurality of times throughout each period of said sine modulated signal, sixth means connected to said third means integrating said voltage therefrom a plurality of times throughout each period of said cosine modulated signal, seventh means connected to said fifth and sixth means for initiating periods, of integration by said fifth and sixth means simultaneously and for predetermined durations of time.

References Cited

UNITED STATES PATENTS

| 2,529,876 | 11/1950 | Jofeh | 343—11 X |
| 2,727,224 | 12/1955 | Adkins et al. | 340—198 |
| 2,900,632 | 8/1959 | Arkus | 343—10 |

RODNEY D. BENNETT, JR., Primary Examiner

MALCOLM F. HUBLER, Assistant Examiner

U.S. Cl. X.R.

340—198